July 21, 1959 E. H. CARRUTHERS 2,895,249
ARTIFICIAL BAIT AND METHOD OF ACTIVATING BAIT
Filed Nov. 4, 1954 2 Sheets-Sheet 1

INVENTOR.
EBEN H. CARRUTHERS
BY
ATTORNEY

July 21, 1959 E. H. CARRUTHERS 2,895,249
ARTIFICIAL BAIT AND METHOD OF ACTIVATING BAIT
Filed Nov. 4, 1954 2 Sheets-Sheet 2

INVENTOR.
EBEN H. CARRUTHERS
BY
ATTORNEY

United States Patent Office 2,895,249
Patented July 21, 1959

2,895,249
ARTIFICIAL BAIT AND METHOD OF ACTIVATING BAIT

Eben H. Carruthers, Hammond, Oreg.

Application November 4, 1954, Serial No. 466,779

8 Claims. (Cl. 43—4)

My invention relates to an artificial bait and a method of activating same, the artificial bait and method of launching the bait from a boat being particularly adapted to the tuna industry.

An object of my invention is to provide an artificial bait particularly adapted for tuna fishing which is convenient to mold, inexpensive and convenient to handle.

A further object of my invention is to provide a method of launching artificial bait from the stern of a tuna clipper in such manner as to give the bait a life-like appearance at least for a sufficient time to induce "chumming."

A further object of my invention is to provide a molded artificial bait in which the individual lures are connected together and severed just prior to launching to enable the convenient storing, handling and launching of the artificial bait.

My invention further contemplates artificial bait which may be molded in strings, webs or connected together as individual lures for convenience in transportation, storage and launching and the severance of the individual lures just prior to launching, the individual lures being launched over the side of the tuna clipper through a tubular member to which a fluid pressure is applied so that the individual lures issue from the end of the tubular member beneath the surface of the water and have considerable velocity to give them an appearance sufficiently lifelike to induce "chumming."

Other objects and advantages of my invention will be particularly set forth in the claims and will be apparent from the following description, when taken in connection with the accompanying drawings, in which:

The bait of my invention is preferably a molded product possibly molded of plastic materials but I contemplate the use of a gelatinous substance as the molding material. While other shapes of molded bait may be employed, it is preferable that the bait be molded to the shape and appearance of a small fish of from 3 to 5 inches in length. In density the bait should be approximately that of sea water at a temperature of between 70° and 80° F. so that the bait will neither be excessively buoyant and therefore subject to wind currents or sink with any degree of rapidity. The bait may be coated with metallic flake or otherwise colored to resemble live fish. Preferably the bait should be also impregnated with oils or fish extracts to give an odor and flavor to the bait, as tuna appear to have a reasonably highly developed sense of smell.

Figure 1:
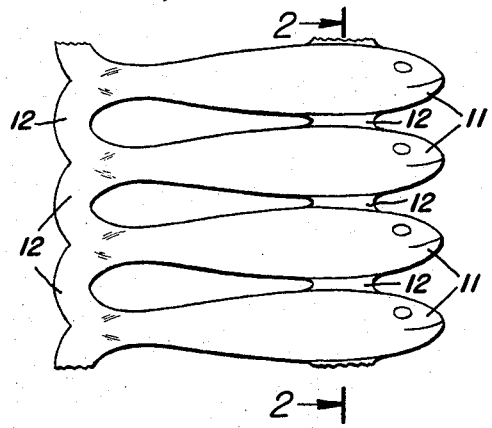
Fig. 1 is a diagrammatic view of the molded bait of my invention showing several individual lures connected together, it being understood that as illustrated the lures are connected together in chain-like fashion or a web sufficient in length for convenient handling and storage.

One of the important aspects of my invention lies in casting the bait in a form such that it may be easily transported, stored and conveyed or propelled during the process of launching it. For this purpose, as illustrated in Fig. 1 the molded bait 11 is cast with fins 12 of thin cross section connecting the adjacent lures of the bait string or web. The fins 12 are relatively thin in cross section in comparison to the cross-sectional area of the individual lures so that in cross section (Fig. 2) the bait string has the appearance somewhat of a chain. In the drawings I have illustrated the individual lures as being connected in the bait chain or web in side by side relation. However, it might be possible to connect them together in end to end relation but as will presently appear the side by side relation of the individual lures is of distinct advantage in enabling the convenient storing and launching of the bait.

Figure 2:
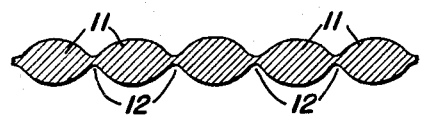
Fig. 2 is a sectional view taken substantially on the line 2—2 of Fig. 1 in the direction indicated by the arrows.

After a web of individual lures has been molded in the form shown in Figs. 1 and 2 to provide an elongated bait string, the web of bait may be wound on a reel 13 which may be made of any suitable, preferably lightweight material, possibly aluminum being most suitable for my purposes. The bait is preferably shipped from the point of manufacture wound on the reel 13 to the point of departure of the tuna clippers. When a tuna clipper is ready for departure it may be loaded with a number of reels of bait which may be stored on the tuna vessel under suitable preservative conditions in the event the bait is molded of a material subject to deterioration such as gelatin.

Figure 4:
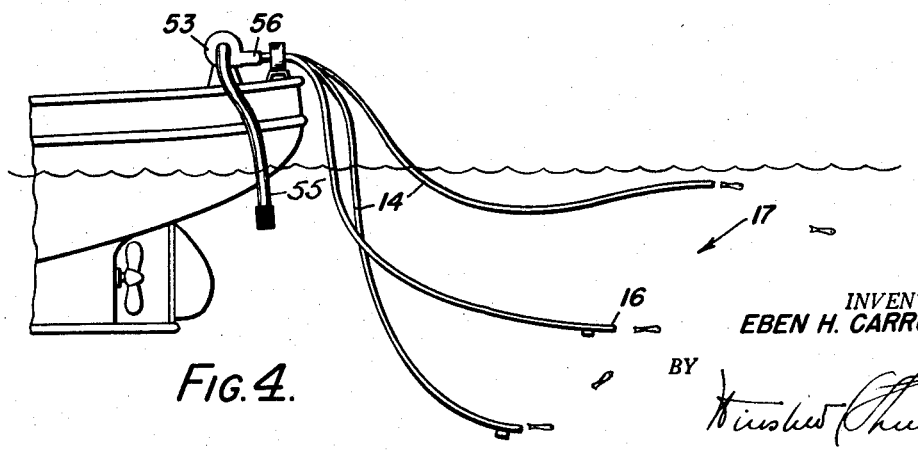
Fig. 4 is a side elevation of Fig. 3.

Coupled with the form in which the chain or string of bait is molded for easy launching is the method of introducing the artificial fish into the water and the means employed for propelling the bait through the water as the individual lures are launched. The method of launching which constitutes the essence of my invention involves the use of launching tubes 14 which may be trailed from the stern of the vessel with the free ends 16 thereof at any suitable depth below the surface of the water as illustrated at 17. If desired, a number of launching tubes may be provided which may be weighted differently so that they will trail from the vessel at different levels below the surface as illustrated in Fig. 4.

While the launching tubes may be made of any suitable material, I contemplate the use of a clear plastic which is preferably flexible for more easy handling and storage on the vessel when not being used. The purpose of employing a clear plastic is so that the launching tubes will be essentially invisible to the fish and so that the individual lures as they pass through the launching tubes under pressure will be visible to the school of fish being "chummed."

The launching mechanism preferably includes a base 18 upon which a pedestal 19 is mounted. At the top of the pedestal a shaft 21 is provided upon which the reels may be readily slipped on and off. A suitable cotter key 22 or other removable fastening device is provided on the free end of the shaft 21 to hold the reel in position as it is unwound, it being understood that the reel is free to rotate on the shaft 21.

Rotatably supported in suitable bearings as indicated at 23 (Fig. 5) is a shaft 24. The bearings 23 are carried by a housing 26 which is supported from the pedestal 19 and a short pedestal 25. A drum 27 is mounted within the housing and rotates with the shaft 24. The upper end of the housing is open as shown at 28 to provide a bait entrance. The drum has flutes 29 which are separated from each other by sharpened edges or points 31. The flutes 29 are of sufficient length to accommodate the length of the bait being employed and the distance between adjacent ridges or high points 31 is such that the string or chain of bait may readily wind itself around the drum chain-fashion as the drum is fed in a manner which will presently appear. The edges 31 and the sides of the drum make a close running fit with the inner side walls of the casing.

The lower end of the drum is provided with an entrance 32 and an outlet 33. As the drum is rotated the flutes are successively brought into alignment with the through channel defined by the inlet 32, the outlet 33 and the flute in alignment with the inlet and outlet. It will be understood that the ridges of the flutes have such close clearance with respect to the inner wall of the housing 26 that when a flute is in alignment with the inlet 32 and the outlet 33, a substantially closed channel is provided.

Any suitable means may be provided for rotating the drum and may include an electric motor 36 and a chain or belt 37 which drives a sprocket or pulley 38. The drum may be driven continuously but preferably is driven intermittently so as to intermittently form the successive closed channels previously described.

The drum may be rotated intermittently by means of a pawl 39 pivoted as indicated at 40 eccentrically with respect to a disc 41 rigidly mounted on the same shaft 42, which supports the sprocket or pulley 38. A ratchet wheel 43 is mounted on the drum shaft 24 engaging a pawl 45 to prevent the drum from rotating in the opposite direction. A guide 44 has its major part configurated to conform to the shape of the drum and has a guide lip 46 shaped so that the string or web of bait is smoothly intermeshed with the flutes of the drum.

Figures 5, 6:
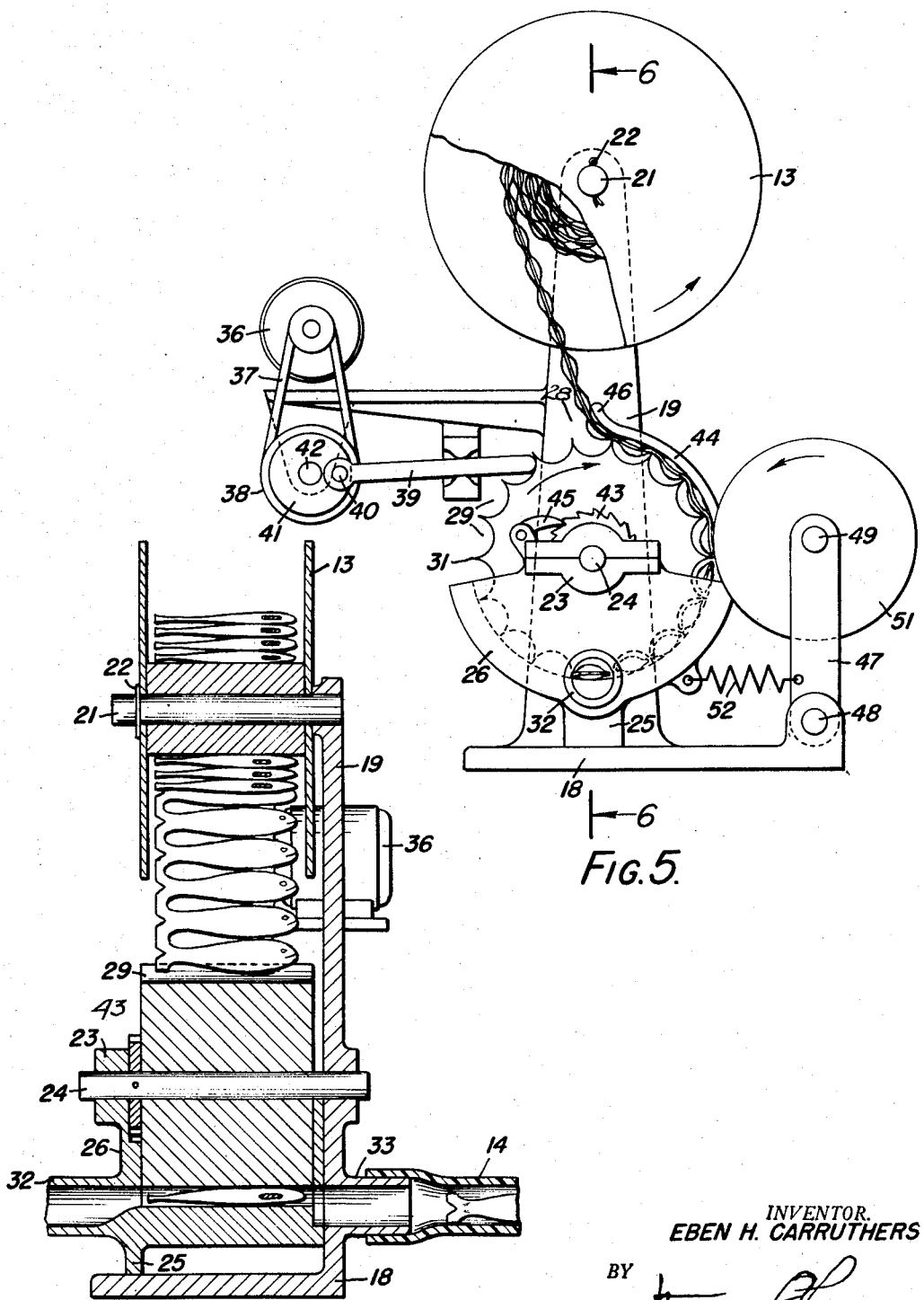
Fig. 5 is a view showing the bait storage reel and the launching mechanism.
Fig. 6 is a sectional view taken substantially on the line 6—6 of Fig. 5 in the direction indicated by the arrows.

Carried by the base 18 are a pair of links 47 which are pivoted to the base at 48 and carry a shaft 49 at their upper ends. Rotatably mounted on the shaft 49 is a roller 51 which has a relatively hard surface. The roller may be made of plastic or aluminum and is urged into engagement with the ridges 31 of the flutes 29 by a spring 52 connected between one of the links and a fixed part of the casing. Thus as the ridges move past the roller 51, the fin-like connecting pieces 12 which separate the individual lures are severed so that beyond the point of contact with the roller 51 in a clockwise direction, as viewed in Fig. 5, each individual lure lies in a pocket defined by a flute. Continued rotation of the drum brings such flute formed pocket into alignment with the inlet 32 and outlet 33. Water pressure from a pump 53 is supplied to the inlet 32 and flows through the channel defined by the inlet 32, the outlet 33 and the particular flute in alignment with the inlet and outlet. This flow of fluid discharges the lures individually through the discharge conduit which is connected to the outlet 33 as shown at 14 (Fig. 6). The intake conduit of the pump is shown at 55.

Figure 3:
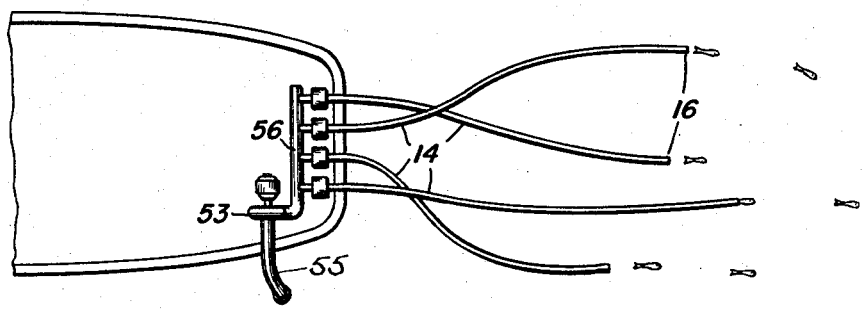
Fig. 3 is a top plan view partly diagrammatic illustrating the method of launching the lures.

When a school of tuna is encountered, it is desirable that the lures be launched in considerable volume and for this purpose I have connected the pump 53 to a manifold 56 so that a number of launching units such as illustrated in Figs. 5 and 6 may be connected to the manifold, as illustrated in Fig. 3, and employed simultaneously.

The pump is preferably of a high pressure type so that the individual lures are launched through the conduits 14 at considerable velocity and will issue from the open ends of the conduits at a velocity sufficient to give them considerable impetus through the water and give the lures a life-like appearance. In "chumming" the objective is to induce the tuna to feed and become excited so that they will strike a baitless hook. It is therefore desirable that the lures be launched rapidly and in sufficient volume for this purpose. If desired, air may be introduced into the water stream so as to give the water issuing from the launching conduits a frothy appearance which may have the effect of further exciting the tuna and cause them to strike. I also contemplate the possibility of using a small amount of live bait along with the artificial bait to provide additional inducement to cause the tuna to feed.

While I have described the method of my invention and have shown the preferred form of apparatus, it will be apparent that various changes and modifications may be made therein, particularly in the form and relation of parts, without departing from the spirit of my invention as set forth in the appended claims.

I claim:

1. A method of making, conveying and launching artificial bait which comprises molding a plurality of separate lures in connected relation, each of said lures being of substantial cross section in comparison with the connections between them, winding said lures in connected relation in the manner of a reel winding, unwinding said connected lures when the lures are to be launched, severing the connections between adjacent lures and launching the lures in succession over the side of the boat by means of fluid flow.

2. A method in accordance with claim 1 wherein after severance the lures are fed in succession to a conduit one end of which is connected to the source of fluid flow and the other end of which is open for discharge of fluid and lures into the sea.

3. Apparatus for launching artificial bait over the side of a boat comprising, in combination, a rotatable drum having pockets formed therein, a casing at least partly enclosing said drum, said pockets having ridges between them, a connection to said casing from a source of fluid pressure, a conduit connected to said casing, said ridges making a close fit with the inner wall of the casing whereby as the pockets are successively brought into registry with said connection and said conduit the lures are discharged from said pockets into said conduit by fluid pressure.

4. Apparatus in accordance with claim 3 in which the artificial bait is molded in the form of a chain-like web of individual lures with connecting fins between the individual lures and means are provided including said ridges for severing said fins during rotation of the drum.

5. Apparatus in accordance with claim 3 in which said conduit is a flexible transparent plastic material which is extended over the side of the boat with its open end in the water.

6. Apparatus for launching artificial bait in which the bait is a molded product with the individual lures being connected together by fins to form a chain-like web the combination with said chain-like web of a reel upon which the web is wound and lure launching mechanism, said launching mechanism comprising a conduit connected to a source of fluid pressure, means for withdrawing said web from the reel and means for severing said fins and feeding individual lures successively to said conduit.

7. Apparatus in accordance with claim 6 in which the launching mechanism includes a rotatable drum having pockets for the reception of individual lures and a casing in which the drum rotates and to which the conduit is connected.

8. Apparatus for launching artificial solid bait over the side of a boat in a manner such as to give it somewhat the appearance of live fish bait, said apparatus comprising, in combination, a conduit one end of which extends from the boat with its lower end in the water, said conduit having its other end connected to a source of fluid pressure sufficient to cause the individual lures to be discharged into the water at a substantial velocity, and means for opening and closing said conduit to admit individual lures in succession to said conduit, said means comprising a rotatable drum having lure compartments for conveying individual lures into said conduit as the drum is rotated.

(References on following page)

References Cited in the file of this patent

UNITED STATES PATENTS

| | | |
|---|---|---|
| 441,676 | Lovegrove | Dec. 2, 1890 |
| 931,553 | Allen | Aug. 17, 1909 |
| 1,328,929 | McDaniel | Jan. 27, 1920 |
| 1,922,841 | Cooley | Aug. 15, 1933 |
| 2,500,494 | Jeffers | Mar. 14, 1950 |
| 2,560,414 | Cheney | July 10, 1951 |
| 2,583,660 | Moore | Jan. 29, 1952 |
| 2,717,419 | Dickey | Sept. 13, 1955 |

FOREIGN PATENTS

| | | |
|---|---|---|
| 907,251 | France | Mar. 7, 1946 |